(12) United States Patent
Hiltunen et al.

(10) Patent No.: US 12,517,072 B2
(45) Date of Patent: Jan. 6, 2026

(54) NMR METHOD AND SYSTEM FOR MEASURING A CHARACTERISTIC OF VENEER

(71) Applicant: Kaakkois-Suomen Ammattikorkeakoulu Oy, Mikkeli (FI)

(72) Inventors: Yrjö Hiltunen, Savonlinna (FI); Ekaterina Nikolskaya, Savonlinna (FI)

(73) Assignee: Kaakkois-Suomen Ammattikorkeakoulu Oy, Mikkeli (FI)

( * ) Notice: Subject to any disclaimer, the term of this patent is extended or adjusted under 35 U.S.C. 154(b) by 129 days.

(21) Appl. No.: 18/570,850

(22) PCT Filed: Jun. 17, 2022

(86) PCT No.: PCT/FI2022/050432
§ 371 (c)(1),
(2) Date: Dec. 15, 2023

(87) PCT Pub. No.: WO2022/263727
PCT Pub. Date: Dec. 22, 2022

(65) Prior Publication Data
US 2024/0280523 A1    Aug. 22, 2024

(30) Foreign Application Priority Data

Jun. 18, 2021 (FI) ..................................... 20215719

(51) Int. Cl.
*G01N 24/08* (2006.01)
*G01R 33/385* (2006.01)
(Continued)

(52) U.S. Cl.
CPC ......... *G01N 24/082* (2013.01); *G01N 24/085* (2013.01); *G01R 33/385* (2013.01); *G01R 33/448* (2013.01); *G01R 33/4608* (2013.01)

(58) Field of Classification Search
CPC .. G01N 24/082; G01N 24/085; G01R 33/385; G01R 33/448; G01R 33/4608;
(Continued)

(56) References Cited

U.S. PATENT DOCUMENTS

| 2008/0150524 A1 | 6/2008 | Song et al. |
| 2013/0176028 A1 | 7/2013 | Mallett et al. |

FOREIGN PATENT DOCUMENTS

| EP | 1893986 B1 | 8/2013 |
| RU | 2482468 C1 | 5/2013 |

OTHER PUBLICATIONS

Rohumaa, Anti, et al. "Monitoring of Birch Veneer Moisture Content During the Drying Process by Single-Sided NMR technique." 7th-International Scientific Conference on Hardwood Processing. 2019. (Year: 2019).*

(Continued)

*Primary Examiner* — Rishi R Patel
(74) *Attorney, Agent, or Firm* — Lathrop GPM LLP; Alex Shtraym (57) ABSTRACT

The invention relates to a system and methods for measuring and determining a characteristic of veneer with NMR spectroscopy in the serial production of veneer, wherein the measurement is taken as online measurement steps from veneer, the measurement steps comprising: creating a magnetic field with two magnets located on the opposite sides of veneer relative to the veneer and opposite to each other, and exposing hydrogen protons in water to the magnetic field for a time required by excitation of protons either by dimensioning the magnetic field in the travel direction of veneer to a sufficient range with respect to excitation of protons relative to the movement speed of the veneer or by moving the magnet and the magnetic field created by it in the travel direction of the veneer during the measurement, and deter- (Continued)

mining veneer moisture distribution based on said amplitude and relaxation time of the backward signal.

8 Claims, 8 Drawing Sheets

(51) Int. Cl.
*G01R 33/44* (2006.01)
*G01R 33/46* (2006.01)

(58) Field of Classification Search
CPC ............ G01R 33/5608; G01R 33/3802; G01R 33/44; G01R 33/46
See application file for complete search history.

(56) References Cited

OTHER PUBLICATIONS

PCT/FI2022/050432, International Search Report dated Oct. 5, 2022.

\* cited by examiner

NMR METHOD AND SYSTEM FOR MEASURING A CHARACTERISTIC OF VENEER

CROSS-REFERENCE TO RELATED APPLICATIONS

This application claims benefit of PCT/FI2022/050432 filed Jun. 17, 2022, which claims benefit of Finnish Patent Application No. FI 20215719, filed Jun. 18, 2021, each of which is incorporated by reference in its entirety.

FIELD OF THE INVENTION

The invention is related to a method for measuring a characteristic of veneer with NMR spectroscopy, wherein the measurement is performed in the following steps of:
  creating a magnetic field for exciting hydrogen protons in water contained in veneer,
  exciting the protons present in veneer with a frequency pulse provided by a coil,
  measuring the backward signal of the frequency pulse returning from protons to the coil,
  determining the relaxation time of protons and the amplitude of the backward signal from the backward signal, and
  determining a characteristic of veneer based on the amplitude and relaxation time of the backward signal.

The invention is also related to a system for determining a characteristic of veneer.

BACKGROUND OF THE INVENTION

Veneer moisture is a factor that influences many characteristics and manufacturing processes of wood products. Veneer drying has a significant role as regards the quality of veneer and products manufactured from it, and it is critical that manufacturing processes can be controlled based on reliable veneer moisture determination.

Publication "Monitoring of Birch Veneer Moisture Content During the Drying Process by Single-Sided NMR technique" (Rohumaa, Antti et al; 7th-International Scientific Conference on Hardwood Processing (ISCHP 2019)—list of conference papers) proposes the use of time domain NMR spectroscopy for determining the moisture content of veneer. In the method of the publication, samples are taken from veneer and reference samples are directly delivered to furnace drying for determining the moisture content, and the moisture content of test samples is determined with NMR spectroscopy in laboratory conditions using a so-called single-sided magnet placed on one side of veneers. With a single magnet, however, it is difficult to achieve a sufficiently strong magnetic field as it decomposes in the environment. Thus, the sample must be kept in the magnetic field for a longer time. However, the method proposed in the publication for determining veneer moisture content is slow and not suitable for process adjustment in real time.

US 2008/150524 A1 discloses a nuclear magnetic resonance apparatus that may be used in connection with a variety of different tools, including a down-hole side-wall coring tool as well as with manufacturing process controllers. In one embodiment, the nuclear magnetic resonance apparatus may include a magnet assembly constructed around a sample chamber. The magnet assembly is constructed and arranged to provide a non-uniform magnetic field having a known magnetic field gradient inside the sample chamber. The use of gradient fields may allow for a more flexible and robust magnet assembly design that may be suitable for a variety of different applications.

US 2013/176028 A1 discloses a system for NMR assessing a sample or a series of samples in turn which comprises means for applying a static magnetic field in a first direction through the sample, pre-polarising means for first applying a magnetic field in substantially the same direction to the sample, means for applying an alternating excitation magnetic field in a second different direction through the sample, means for sensing energy emitted by the sample in response to the excitation magnetic field, and means arranged to provide an indication of an assessment of the sample based on the energy emitted by the sample in response to the excitation magnetic field.

EP 1893986 B1 discloses a portable industrial quality and process control (QPC) system for imaging over a large field of view and subsequently imaging over a portion thereof at higher resolution, comprising inter alia at least one packed array of multi-streamed magnetic resonance devices of substantially no fringing magnetic fields, adapted to analyze adjacent lines of objects optionally in situ simultaneously; and optionally comprising an improved feeding system comprising at least two adjacent feeding streams carrying a plurality of objects to be detected or analyzed simultaneously or in any predetermined sequence. EP 1893986 B1 also discloses a method for performing magnetic resonance imaging, performing measurements on a plurality of streams of samples and optionally feeding at least two adjacent feeding streams carrying a plurality of objects to be detected or analyzed simultaneously or in any predetermined sequence.

RU 2482468 C1 discloses a method for examination of the inner structure of sawing in logs woodworking industry which method is carried out on index of moisture distribution in different areas of sawing logs, using magnetic resonance imaging, and the areas of heartwood and sapwood parts of sawing logs are defined, the border is set between them, and the cutting of sawing log for sawn wood products on the basis of the results obtained is carried out taking into account minimising the number of sawn wood products including both areas. The method provides the ability to carry out the examination of the inner structure of sawing logs by the method of magnetic resonance imaging on index enabling to increase efficiency of sorting technologies, hydrothermal treatment, mechanical treatment of sawing logs, technology of drying the sawn wood products and peeled veneer, and also glueing of sawn wood products by increasing the quality of the resulting materials.

SUMMARY OF THE INVENTION

The object of the invention is to provide a method and system faster than prior art methods and systems for determining a characteristic of veneer, enabling determination of veneer moisture distribution as an online measurement almost in real time.

The present invention is characterized by a method for measuring a moisture distribution of veneer with NMR spectroscopy in a serial production of veneer as online measurement steps, wherein a whole veneer is moved at a movement speed along a travel direction in a travel plane, the veneer having a width between 10 cm and 200 cm in a transverse direction perpendicular to the travel direction in the travel plane, and two sides, the method including steps of creating a magnetic field in a selected point in a transverse direction of the veneer for exciting hydrogen protons in water contained in the veneer, by using two magnets located on opposite sides of the veneer, one side above and another side below the travel plane, and essentially opposite to each other: leading the veneer to the magnetic field: exposing the hydrogen protons of the veneer to the magnetic field for a time required to obtain a sufficient pre-magnetization and excitation of the hydrogen protons either by dimensioning the magnetic field in the travel direction of the veneer to a sufficient range relative to movement speed of the veneer by including a pre-magnet for each magnet placed prior to the magnet in the travel direction of the veneer or by moving the magnet and the magnetic field created by the magnet in the travel direction of the veneer during the measurement: exciting the hydrogen protons in veneer with frequency pulses provided by a surface coil: measuring a backward signal of frequency pulses returning from the protons to the surface coil, wherein the measurement is taken from the veneer currently in the veneer production process without deviating the veneer from its normal travel path in the veneer production process and without stopping or essentially slowing down the veneer in the veneer production process, wherein the magnets and the surface coil are supported near the veneer using a measuring frame: fitting, based on a physical model of water location in fibres of the veneer, where a first component of water corresponds to water in cell walls of each fibre, a second component of water corresponds to water contained in small pores, a third component of water corresponds to water contained in larger structures, such as lumens, respectively, the backward signal mathematically as a correlation model which is a model consisting of three exponential signals $Exp=A_1*exp(-t/T_{21})+A_2*exp(-t/T_{22})+A_3*exp(-t/T_{23})+D$, where D is a measuring-technical constant, Exp is the backward signal, $A_1$, $A_2$. As are amplitudes of the three exponential signals of the backward signal, each amplitude relating to one of the three water components, $T_{21}$, $T_{22}$, $T_{23}$ are corresponding relaxation times of the three water components and t is the signal measurement time, thereby obtaining the amplitudes $A_1$, $A_2$, $A_3$ and relaxation times $T_{21}$, $T_{22}$, $T_{23}$; and determining the moisture distribution within the cell walls, small pores and larger structures of veneer based on the amplitudes $A_1$, $A_2$, $A_3$ and the relaxation times $T_{21}$, $T_{22}$, $T_{23}$.

It is surprising that the moisture measurement is directly made on a moving whole veneer without detaching a separate sample and without leading the veneer through a separate sample chamber. In this way, the moisture measurement can be performed quickly and cost-efficiently. In this context, an essentially whole veneer means a veneer from which a separate section has not been detached in its travel direction for the moisture measurement. A veneer, from which a narrow edge strip has been cut for cleaning the edges, for example, or which has been cut transversely to the travel direction of the veneer as finished veneer products, is also an essentially whole veneer in this purpose.

The moisture measurement is taken from a moving veneer. Thus, it is not necessary to stop the veneer in the process. Alternatively, the measurement can be taken from a veneer in a process step in which stopping of veneers is easier than on the production line.

The backward signal is exponential.

The magnetic field is created during online measurement steps in a selected point in the transverse direction of veneer by two magnets placed on the opposite sides of veneer relative to the veneer and essentially opposite to each other.

The veneer is led to the magnetic field, frequency pulses are generated with a surface coil, and said protons are exposed to the magnetic field for a time required by excitation of protons, by either dimensioning the magnetic field in the travel direction of the veneer to a sufficient range with respect to excitation of protons relative to the movement speed of the veneer or transferring the magnet and the magnetic field created by it in the travel direction of the veneer during the measurement.

In the method according to the invention, an opposite use of two magnets provides a strong magnetic field, which partly enables excitation of hydrogen protons in water contained in veneer sufficiently fast for the measurement while the veneer moves. On the other hand, the movement speed of veneer in the manufacturing process of veneer is 0.3-10, preferably 2-5 m/s: thus, excitation of protons in the sample point of veneer must be boosted by either extending the magnetic field to such a large range that a sufficient dwell time is achieved for protons in the magnetic field or, alternatively, increasing the dwell time of veneer in the magnetic field by moving the magnet parallel to veneer during the measurement. In this way, a moisture distribution measurement can be made on a moving veneer as an online process; that is, a magnet and a coil are placed in connection with the moving veneer, and it is not necessary to detach a sample from the veneer for laboratory measurements. When performed with NMR spectroscopy, information is obtained on the distribution of water in veneer into bound and free water and not only superficial veneer moisture information, as is generally the case in online measurements.

The width of a veneer corresponds to the width of the production line. In other words, a separate batten is not detached from a veneer for the moisture measurement, but the measurement is taken directly from a whole veneer.

The width of a veneer ranges between 10 and 200 cm, which is a typical veneer width in plywood manufacture.

The measurement is taken from a veneer moving on the production line. In other words, a separate sample line is not provided for the veneer for the moisture measurement, but the moisture measurement is taken directly from a moving veneer on the production line, which facilitates the implementation of the system.

The surface coil has a very low height and its diameter may equal the diameter of the magnet used. Hence, it requires little space and is suitable for the application, a veneer with a large perimeter of cross section passes the system. Leading a whole veneer through a traditional spiral coil would be practically impossible in this situation, because the size of the coil would then be very large, as would be the amount of its manufacturing costs.

In the method according to the invention, veneer moisture determination is performed from a whole veneer as an online measurement without slowing down the line. Furthermore, the determination is performed without using a separate measuring chamber, because forming a sufficiently large measuring chamber would be very expensive and its use very difficult. This is surprising, because attempts have been traditionally made in the NMR measurement to minimise external disturbances in the magnetic field by the use of a measuring chamber, into which a sample is led. In the method according to the invention, a sample is not detached from a veneer as a narrow batten, for example, but the whole veneer constitutes the measurement area, thus allowing the creation of a moisture profile.

In this context, an online measurement means that the measurement is taken from a veneer currently in the process without deviating it from its normal travel path and without stopping or without essentially slowing down the veneer: thus, while the veneer proceeds normally in the process.

In the method, said moisture distribution is advantageously determined relative to bound water and free water of veneer based on said amplitude (A) and relaxation time (T) of the backward signal by mathematically fitting the backward signal to a correlation model of at least two and preferably at most four exponential signals $$\mathrm{Exp} = \left( \sum_{1}^{2-4} \left( A_x \exp\left(-\frac{t}{T}\right) + C \right) \right),$$

where Exp is the backward signal, A is the amplitude of the backward signal, T is the relaxation time and t is the signal measurement time and C is a measuring-technical constant. Moisture distribution can be quickly determined from the backward signal without a need to know the absolute moisture content.

Advantageously, the backward signal is fitted to a correlation model using the method of least squares. It is known that the backward signal has the form of an exponential signal. With the method of least squares, using a known mathematical method, it is possible to form a dedicated exponential component from the backward signal for internal water of veneer cells as well as for cell-external free and bound water, and calculate the relative proportions of these in veneer.

Advantageously, the method measures 5 to 10 amplitudes for each backward signal. In this way, the measurement and the processing of measurement data to form a moisture profile are very fast and allow for obtaining real-time information on the moisture and moisture profile of veneer.

According to an embodiment, the method is used to determine, as moisture distribution, the relative amount of water as a proportion of bound water to free water of veneer fibre by calculating the relaxation speed for each exponential component of the backward signal as an inverse of the relaxation time and the relative proportion of bound water using the equation $p_b=(R_2-R_f)/(R_b-R_f)$, and correspondingly, the relative proportion of free water $p_f=1-p_b$.

Advantageously, the measurement is taken simultaneously from several parallel measuring heads to obtain transverse moisture distribution of veneer. In this way, the method according to the invention can be used to obtain information on veneer moisture distribution in the transverse direction, which is significant quality information related to veneer for its further processing.

Advantageously, in addition to a surface coil, the method uses gradient coils to create a gradient magnetic field for forming moisture distribution in the direction perpendicular to the veneer. The gradient magnetic field formed with gradient coils from a magnetic field provides information on moisture distribution in the perpendicular direction of veneer.

Advantageously, when using gradient coils, a FID measurement is taken from the backward signal and a Fast Fourier Transform (FFT) is performed to the result of the FID measurement, providing information on moisture distribution in the perpendicular direction of veneer.

The measurement is preferably performed at a frequency of 20 to 200 Hz. Hence, several measurement results are obtained from a moving veneer in the movement direction of the veneer, based on which it is possible to form moisture distribution in the longitudinal direction of the veneer.

In the most advantageous embodiment, the measurement is taken in the method from several points in the transverse direction of veneer using the aforementioned high measuring frequency and again gradient coils. Hence, the method can be used to form an extremely comprehensive moisture distribution for veneer in the longitudinal, transverse and perpendicular directions, thus, in all three dimensions.

The method uses a model consisting of three exponential signals $\mathrm{Exp}=A_1*\exp(-t/T_{21})+A_2*\exp(-t/T_{22})+A_3*\exp(-t/T_{23})+D$ to determine the relaxation time, where D is a second measuring-technical constant, where Exp is the backward signal, A is the amplitude of the backward signal, T is the relaxation time and t is the signal measurement time. In this type of model, the first exponential component tells of the proportion of water in the cell wall, the second one of water contained in small pores and the third one of water contained in larger structures, such as lumens. The correlation of exponents to the location water in a wood structure has not been known earlier in prior art.

In case several measuring heads are used in parallel in the method in the transverse direction of veneer, a multiplexer is advantageously used in the method for scheduling backward signals arriving from coils with the NMR spectroscopy computer and for software means for calculation. Hence, the calculation of the method can be performed using one computer and one set of software means alternately for each measuring head in the transverse direction of veneer. However, the measurement is very fast, less than 0.5-5 ms, preferably 0.8-1.2 ms, and the calculation of measuring heads can thus take place in series instead of a parallel calculation for reducing investment and operating costs.

According to an embodiment, the method can additionally include a calibration step, in which samples are taken from veneer, absolute moisture content is determined for a first group of samples by drying, and the relaxation time and amplitude of the backward signal are determined for a second group of samples. In addition, the measuring-technical constant of the correlation model is determined and absolute moisture content of veneer is determined using the correlation model. In this way, the method can be used to obtain both the moisture distribution of veneer and the absolute moisture content of veneer at the same time.

Advantageously, the method uses the same coil with a duplexer for both generating a frequency pulse and detecting it, which duplexer automatically changes the coil from the power source that generates the frequency pulse to measuring electronics after providing the frequency pulse and again after the measurement.

Advantageously, the frequency pulse induced in the coil is measured with electronics that is arranged to receive a resonance frequency typical for hydrogen protons in water, which can range between 20 and 30 MHz, for example, 22 or 26 MHz, depending on the magnetic field strength. In this way, it is possible to avoid any influence other than that of hydrogen protons on the measurement. On the other hand, a backward signal provided by hydrogen protons in solid wood does not disturb the measurement, because the excitation state of protons in solid material is discharged prior to starting the measurement after providing the frequency pulse with the same coil. Generally, there is an interval of approximately 100 microseconds between providing the frequency pulse and starting the measurement in order that the effect caused by a remarkably larger frequency pulse on the coil is removed before starting a notably sensitive measurement.

Advantageously, 5 to 10 amplitudes are measured on each backward signal. In this way, the measurement can be kept quite fast in order to maintain real-time measurement and calculation during moisture measurement of a veneer that moves even at a speed of 2 to 5 m/s. Generally, for liquid samples, for example, the measurement sample is stopped during the determination and the measurement is not taken while the sample moves continuously, as is the case in the process according to the invention.

Both the magnets and the surface coil are supported to a measuring frame so that the magnets are on the opposite sides of veneer, one above and the other below veneer. With the measuring frame, the magnets and the surface coil(s) can be supported in connection with a moving whole veneer without using a measuring chamber.

The measuring frame preferably surrounds the moving whole veneer. Hence, the measuring frame is very firm. Alternatively, the measuring frame can be an arm extending from the border of the line to the area of the moving line.

The present system is characterized by a system for determining a moisture distribution of veneer in a serial production of veneer, including transfer equipment configured to move the whole veneer in a serial production of veneer at a movement speed along a travel direction in a travel plane, wherein the veneer has a width between 10 cm and 200 cm in a transverse direction perpendicular to the travel direction in the travel plane and two sides: a time domain NMR spectrometer for determining the moisture distribution of the veneer the NMR spectrometer including at least one surface coil arranged in connection with the veneer to excite hydrogen protons in water contained in the veneer using frequency pulses and two magnets located on opposite sides of the veneer, one side above and another side below the travel plane, and essentially opposite to each other for creating a magnetic field in the veneer in a selected point in the transverse direction of the veneer: either i) a pre-magnet for each magnet located prior to the magnet in the travel direction of veneer, length of the pre-magnets being dimensioned in the travel direction of the veneer to a sufficient range relative to the movement speed of the veneer, or ii) second transfer equipment for transferring the magnets in the travel direction of veneer during measurement such that the hydrogen protons of the veneer are exposed to the magnetic field for a time required for a sufficient pre-magnetization with respect to excitation of the hydrogen protons: a power source with controllers connected to the coil for generating frequency pulses: measuring equipment for measuring intensity of current generated by the frequency pulse returning to the coil from the hydrogen protons for generating a backward signal: a computer with a memory and a software for determining the moisture of the veneer based on the backward signal, wherein a correlation model is stored in the memory, which is a model consisting of three exponential signals $Exp=A_1*exp(-t/T_{21})+A_2*exp(-t/T_{22})+A_3*exp(-t/T_{23})+D$, where D is a measuring-technical constant, Exp is the backward signal, $A_1$, $A_2$, $A_3$ are amplitudes of the three exponential signals of the backward signal, wherein each of the amplitudes relates to one of three water components of a physical model of water location in fibres of the veneer, namely first component, second component and third component, wherein the first component of water corresponds to water in the cell walls, the second component corresponds to water contained in small pores and the third component corresponds to water contained in larger structures, such as lumens, respectively, $T_{21}$, $T_{22}$, $T_{23}$ are corresponding relaxation times of the three water components and t is the signal measurement time, thereby obtaining the amplitudes $A_1$, $A_2$, $A_3$ and relaxation times: wherein the software is arranged to: fit the backward signal mathematically to the correlation model to determine the amplitudes $A_1$, $A_2$, $A_3$ and the T2 relaxation times $T_{21}$, $T_{22}$, $T_{23}$ of the three different water compartments of the veneer fibres and determine the moisture distribution within the veneer based on the amplitudes $A_1$, $A_2$, $A_3$ and the relaxation times $T_{21}$, $T_{22}$, $T_{23}$.

The coil is a surface coil and said magnetic field is either dimensioned in the travel direction of veneer to a sufficient range with respect to excitation of said protons relative to the movement speed of veneer or arranged to be moved in the travel direction of veneer during the measurement.

In the system according to the invention, the measuring head consisting of a magnet and a surface coil can be placed in connection with a moving whole veneer and the moisture distribution can be measured from the moving veneer. Instead, the power source, computer and software means can be placed further away from the veneer in more advantageous conditions, such as in a control room. The two magnets of the system according to the invention placed opposite to each other (or a so-called double-sided magnet) enable the creation of a strong and homogeneous magnetic field in veneer, which partly enables a quick and accurate determination of moisture distribution.

Advantageously, the magnetic field created by the magnets is arranged to be mobile or its range is dimensioned so that an individual measuring head of veneer is in the area of influence of the magnet for 0.5-5 ms, preferably 0.8-1.2 ms. In this way, protons in veneer have time to become excited in the magnetic field prior to the frequency pulse provided by the coil.

Advantageously, the system includes at least two parallel measuring heads each comprising said coil and said two magnets for taking a measurement from several parallel measuring heads simultaneously for forming a transverse moisture distribution of veneer. In this way, a more comprehensive moisture distribution can be formed also in the transverse direction of veneer.

Alternatively, the system may include a measuring head composed of two opposite magnets and a coil, arranged to move or traverse in the transverse direction of a veneer between the edges of the veneer so that, in the travel direction of veneer, the distance between the measurement results of the measuring heads located in the same place in the transverse direction of veneer is covered by a statistical analysis, such as interpolation, for forming the moisture distribution of the whole veneer. However, such an implementation is a weaker solution in terms of reliability compared to the use of several measuring heads.

In an embodiment of several measuring heads, the system preferably includes a multiplexer for leading the backward signals coming from the coils of parallel measuring heads alternately to said computer for calculation. In this way, calculation can be implemented without parallel computing units, which would increase investment and maintenance cost of the equipment.

The coil used in the system is a surface coil. A surface coil has a low construction, over which a veneer can be led.

Advantageously, in addition to the surface coil, the system includes gradient coils for converting the magnetic field to a gradient field. When using gradient coils, a form of the backward signal can be achieved, based on which it is possible to determine the location of water in the perpendicular direction of veneer. Hence, the surface coil provides a frequency pulse and receives a backward signal.

Advantageously, the polarities of magnets are opposite on different sides of the veneer; that is, in the first magnet S-N, a sample between, and the second magnet S-N, in order to strengthen the magnetic field created.

According to a first embodiment, the system includes a pre-magnet for each magnet placed prior to the magnet in the travel direction of veneer for creating a magnetic field in the travel direction of veneer to a sufficient range with respect to excitation of protons relative to the movement speed of veneer. With a pre-magnet, it can be ensured that protons remain in the magnetic field for a sufficiently long time to become definitely excited in the strong homogeneous magnetic field between two magnets.

The pre-magnet is preferably a component separate from the magnets of the measuring heads, in which case it can be a remarkably more inhomogeneous and stronger magnet. This is more affordable in terms of its investment costs compared to a homogeneous magnet.

As an alternative to the first embodiment, according to a second embodiment, the system includes transfer means for transferring the magnet in the travel direction of veneer, if the magnetic field is arranged to be transferred in the travel direction of veneer during the measurement. In this case, the use of a pre-magnet can be avoided.

Transfer means may include guides in the travel direction of veneer fastened near the veneer, a carriage arranged to be moved on the guides, a measuring frame connected to the carriage, the measuring frame comprising an upper beam and a lower beam for connecting said coils and magnets to the measuring frame, and a motor and a transmission for moving the carriage on the guides in the travel direction of veneer during the measurement and in the opposite direction between the measurements. This is one possible implementation for transferring the magnetic field together with a moving veneer.

The distance between magnets can range between 1 and 20 cm, preferably 5 and 12 cm. Hence, the magnetic field created is sufficiently strong for reliable NMR spectroscopy.

In the method and system according to the invention, it is not necessary to determine the absolute moisture content of veneer, because an analysis of the relative proportions of bound and free water obtained with NMR spectroscopy is sufficient for utilising moisture distribution. The method allows for an analysis of the mere change in the distribution between successive veneers for monitoring the effects of process changes and adjusting the process. Seasonal variations and variations caused by raw materials bring variation to veneers related to moisture, which is why veneer moisture distribution obtained with the method and system according to the invention is extremely significant, for example, for controlling a dryer or, in wet sealing, to identify veneers that correspond to each other with respect to their moisture.

BRIEF DESCRIPTION OF THE DRAWINGS

The invention is described below in detail with reference to the accompanying drawings that illustrate some of the embodiments of the invention, in which.

DETAILED DESCRIPTION OF THE INVENTION

Figure 1:
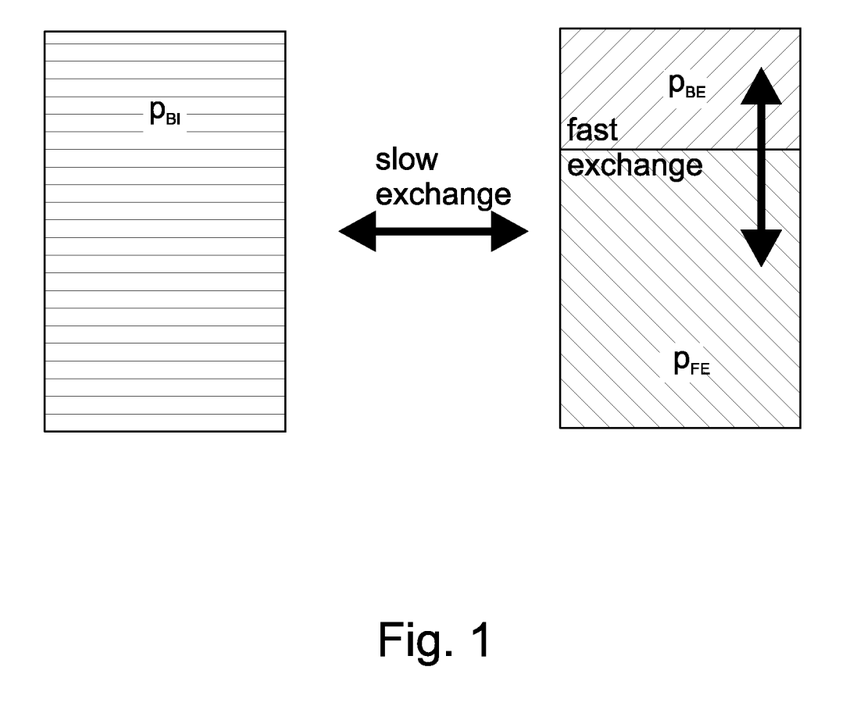
FIG. 1 is a basic view of the location and movements of water relative to fibre.

FIG. 1 is a basic view of how water is located relative to veneer fibre. It is known that fibre contains cell-internally bound water $p_{BI}$ and both bound water $p_{BE}$ and free water $p_{FE}$ cell-externally, in smaller or larger spaces, such as lumens. Water molecules can change place outside the cell binding to water bound from free water or releasing from bound water into free water quite quickly due to physical phenomena or chemical reactions. It has been noted that the transfer of water from inside to outside the cell is slow due to the structure of the secondary wall of fibre. While the sum of the relative proportions of cell-internal free and bound water is $p_{BI}+p_{FI}=1$, in practice, it is $p_{BI}=1$, because water is almost completely bound water inside the cell. The sum of the relative proportions of external free and bound water is $p_{BE}+p_{BE}=1$.

Figure 2:
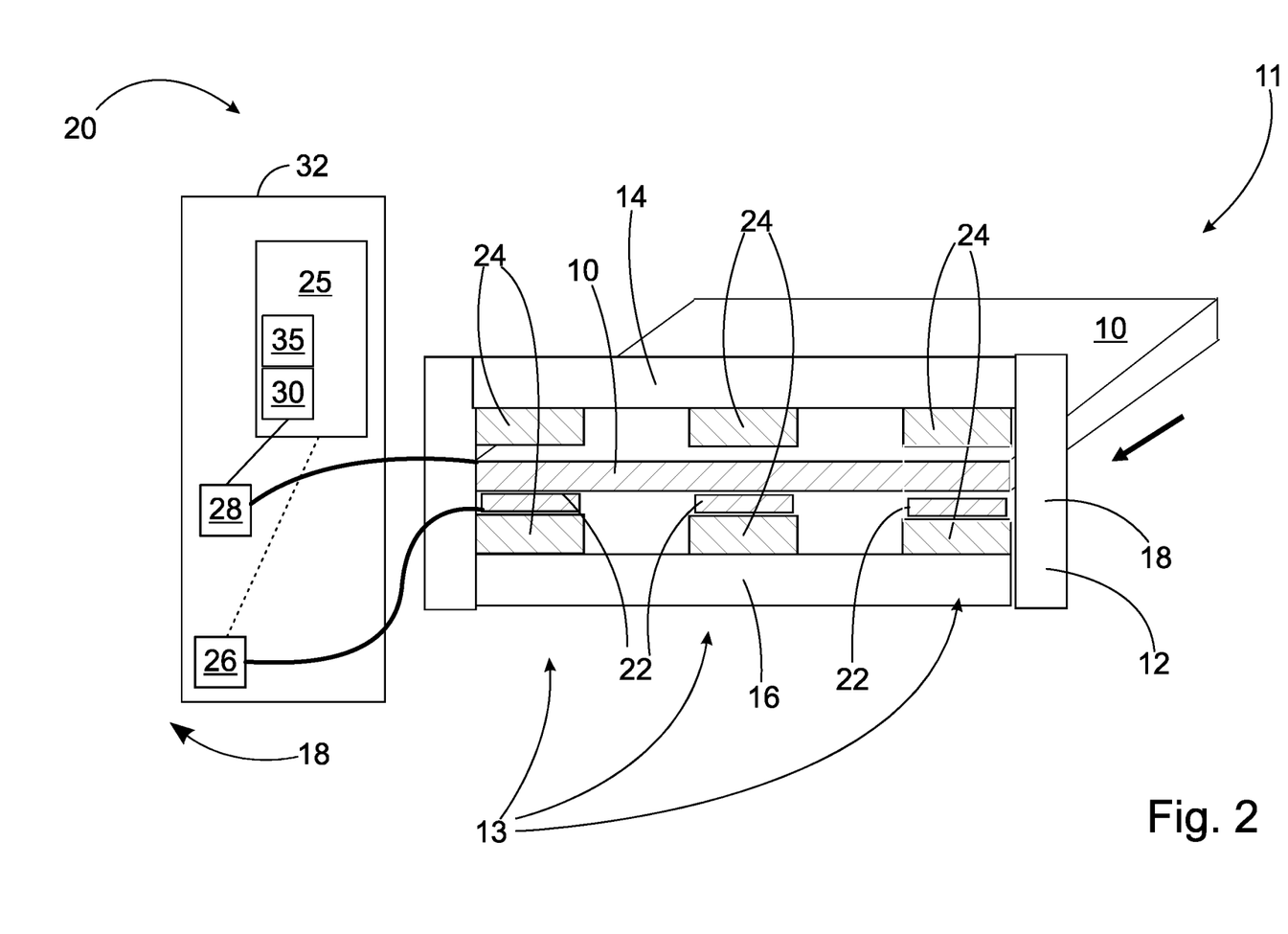
FIG. 2 is a basic overview of a system according to the invention.
Figure 3:
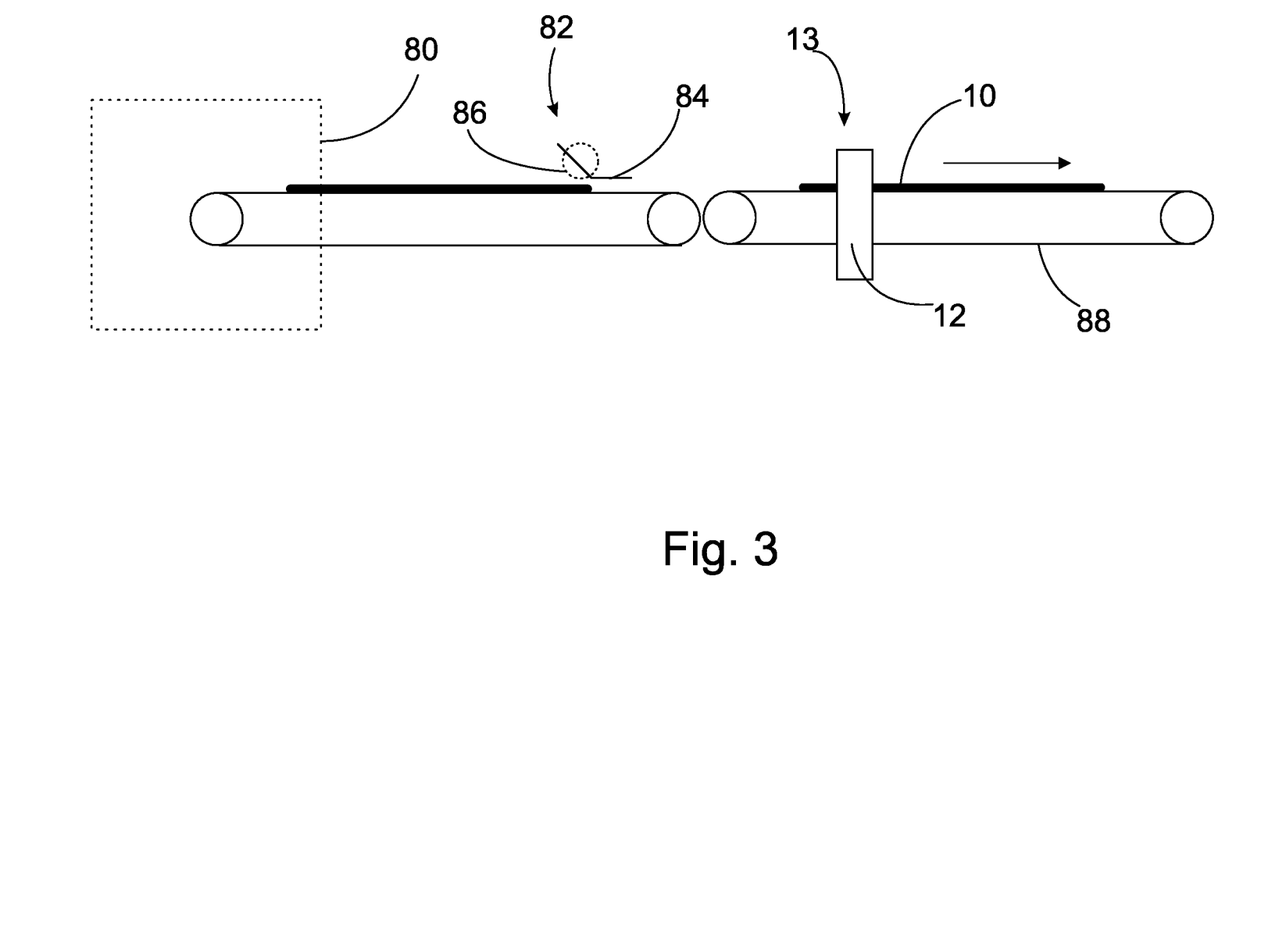
FIG. 3 is a lateral view of the process location of a system according to an embodiment of the invention.

According to FIG. 2, the system 11 according to the invention includes, as main components, a measuring head 13 of an NMR spectroscope 20 and a computer 25, which are preferably separately located and connected, for example, with a CAN bus or other field bus. The measuring head 13 is composed of at least one coil 22 and magnets 24 shown in FIG. 2, which are preferably connected to a measuring frame 12. In turn, the measuring frame 12 preferably includes an upper beam 14 and a lower beam 16, as well as vertical beams 18 connecting these. The measuring head 13 of the system 11 according to the invention is located, as an online measurement, in connection with a veneer 10 that moves during the manufacturing process of veneer 10, for example, as illustrated in FIG. 3, preferably immediately after sawing 80 of the veneer 10, wherein the veneer 10 moves on accurately controlled conveyors 88, between them or by means of them. To be able to align the movement of the veneer 10 between the magnets 24 of the measuring head 13 of the NMR spectroscopy, as illustrated in FIG. 2, feed equipment of veneer may include, for example, collecting guides 82, illustrated in FIG. 3 with broken lines, feeding rollers 86 or guide plates 84 or equivalent, which guide the veneer accurately between the magnets and prevent the veneer from colliding to the components of the system according to the invention. Deviating from FIG. 3, feed equipment may also consist of two conveyors, between which the veneer travels accurately controlled through the measuring beam. The speed of the veneer in the process may range between 0.3 and 10, preferably 2 and 5 m/s and the thickness of the veneer between 0.5 and 5 mm, preferably 1 and 3 mm. As regards the creation of a strong magnetic field, it is important that the distance between magnets can be kept as small as possible, 1 to 20 cm, preferably 5 to 12 cm; therefore, guiding of the veneer to the measuring frame must also be accurate.

A system according to the invention can be located immediately after milling or sawing, but optionally also after drying.

For example, if the speed of the veneer in the process is 260 m/min or 4.3 m/s and the time required for the measurement is 1 ms, the veneer moves 4 mm during the measurement. Thus, the length of the measuring range created by the magnetic field is approximately 10 mm. In turn, the sample frequency can be 40 Hz when the measurement distance is 10 cm, for example. The sample frequency means the frequency at which the coil is provided with frequency pulses.

Figure 4A:
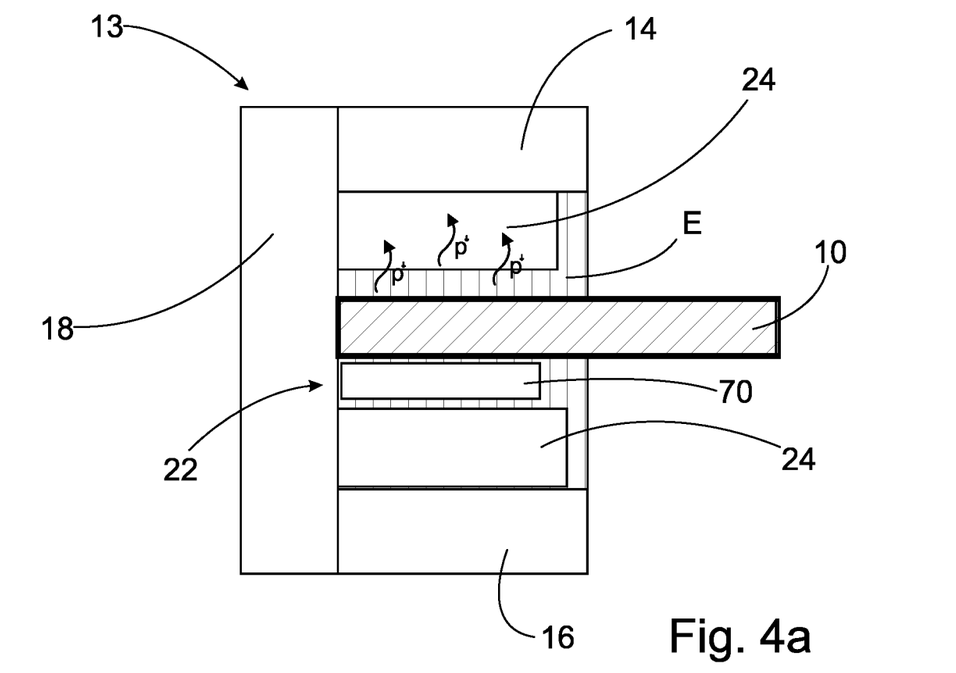
FIG. 4a is an enlargement of a measuring head of a first embodiment placed perpendicular to the travel direction of a veneer.

The NMR spectroscope 20 preferably includes at least two parallel measuring heads 13, as shown in FIG. 2, each of which includes one coil 22 for exciting hydrogen protons p in free and bound water contained in the fibres of veneer 10 and two magnets 24 arranged in connection with the veneer 10 opposite to each other, each on one side of the veneer 10, for creating a magnetic field E illustrated in FIG. 4a in the veneer 10. Advantageously, the coil 22 used is a surface coil 70 according to FIG. 4a, placed between the magnets 24. The magnetic field E created by the magnets 24 is advantageously a magnetic field as homogeneous and static as possible, through which the veneer 10 travels. The magnetic field E is illustrated in FIG. 3 with lines between the magnets 24 and transverse to the veneer 10. The direction of the magnetic field E is advantageously transverse relative to the longitudinal direction of the veneer 10. Magnets are advantageously permanent magnets that are implementable without separate driving power in order to operate. A permanent magnet creates a static permanent magnetic field in itself. Alternatively, the magnet can also be an electromagnet, the magnetic field of which is provided by electric current, but the problem with these is generation of heat, which can lead to a cooling need.

In addition, the NMR spectroscope 20 includes, as shown in FIG. 2, a power source 26 connected to a coil 22 for generating frequency pulses, measuring equipment 28 for measuring the intensity of voltage generated by the frequency pulse returning to the coil 22 from protons p for generating a backward signal, and software means 30 for determining veneer moisture distribution based on the backward signal. With the power source 26, a frequency pulse is delivered to the coil 22 to excite hydrogen protons p present in bound and free water travelling inside the coil 22 into a higher energy state (spin) as the protons absorb the frequency pulse. This energy state is discharged quickly (within milliseconds), the proton p thus releasing or emitting energy to its environment. This again generates a voltage in the coil 22, i.e., a backward signal, the amplitude of which can be measured with the measuring equipment 28.

Figure 4B:
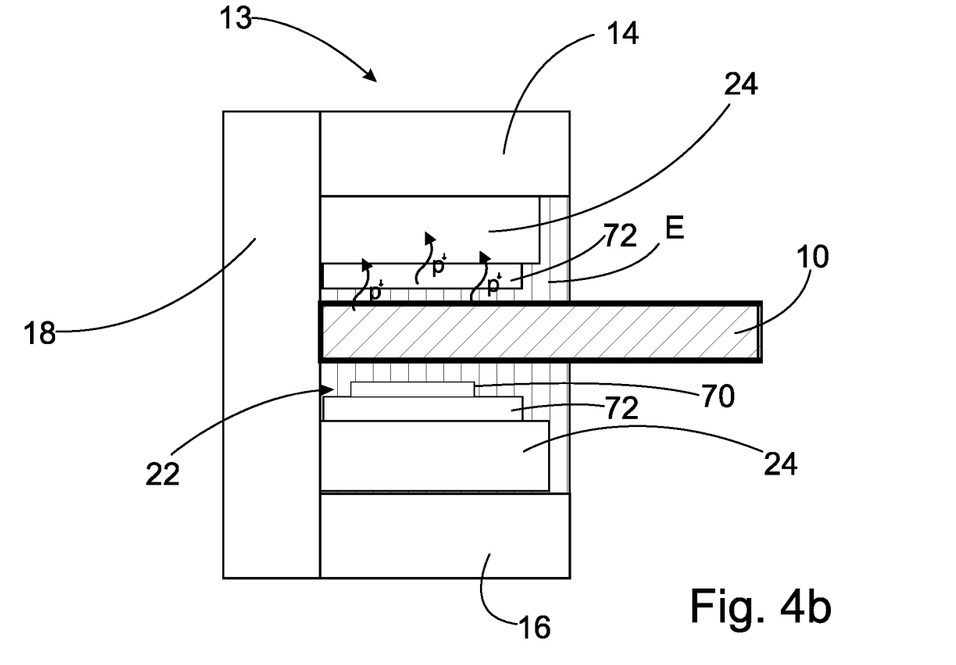
FIG. 4b is an enlargement of a measuring head of a second embodiment placed perpendicular to the travel direction of a veneer, when gradient coils are used in the measuring head.

According to an embodiment, as illustrated in FIG. 4b, in addition to the surface coil 70 functioning as the coil 22, gradient coils 72 can be used in the system 11. It is known that gradient coils 72 create a suitable gradient magnetic field by means of electric current. In a gradient magnetic field, the magnetic field E changes homogeneously, the resonance frequency thus depending on the place. A surface coil 70 is used with gradient coils to provide frequency pulses and receive a backward signal.

The so-called CPMG (Carr-Parcell-Meiboom-Gill) pulse sequence, which contains one 90° pulse and several 180° pulses, is used in the relaxation time measurement, and a so-called echo height is measured between each pulse. FID (free induction decay) is composed of only one 90° pulse, after which FID is measured. The signal is an attenuating space-time signal to which a Fast Fourier Transform (FTT) can be performed to make the signals visible in the frequency space. Because the magnetic field changes due to the effect of the gradient, the signal frequency of water is different in different points in the gradient direction. The echo amplitudes of the CPMG pulse sequence attenuate according to the following equation:

$$a(t)=a_o \exp(-t/T_2),$$

where $a_0$ is the amplitude at the time t=0s and T2=spin-spin relaxation time. Parameters $a_o$ and T2 can be defined by fitting the equation to an experimental signal.

The computer 25 of the system 11 is equipped, as shown in FIG. 2, with software means 30 for determining veneer moisture distribution based on the backward signal by determining the proton relaxation time and the backward signal amplitude from the backward signal and veneer moisture distribution based on these.

According to an embodiment, magnets and the coil can be partly encased with a box construction. Advantageously, the box construction is made of metal, thus preventing expansion of the magnetic field to the environment and, on the other hand, access of disturbances external to the system to the magnetic field of the system. This facilitates the use of the system in mill conditions. In turn, the measuring equipment, computer and power source can be placed further away from a moving veneer in more advantageous conditions, such as a control room for the veneer manufacturing process. This prevents damage of sensitive electronic components in the process.

Figure 5:
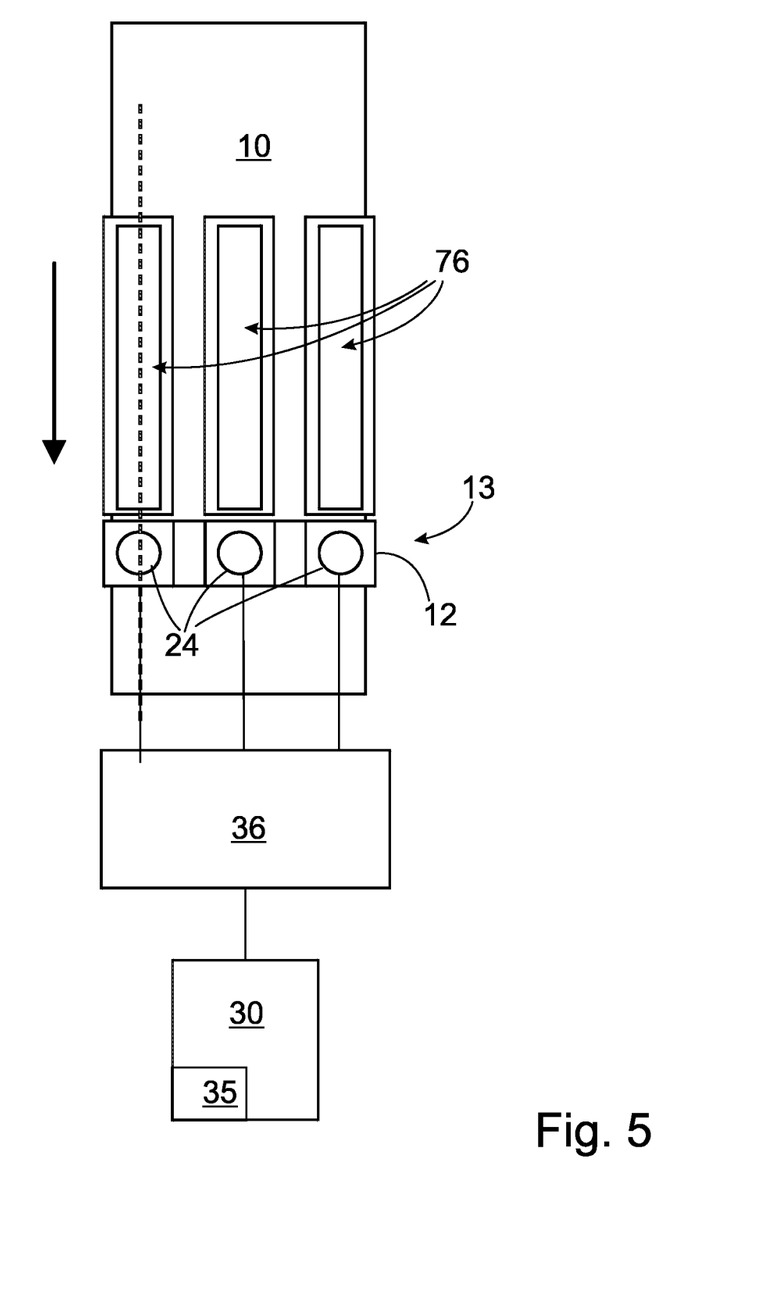
FIG. 5 is an implementation of a system according to an advantageous first embodiment placed perpendicular to a veneer.

As regards the determination of moisture distribution of a moving veneer, it is essential that protons present in veneer have time to become excited in the magnetic field created by the magnets prior to the frequency pulse provided by the coil. To avoid increasing the size of magnets to an unreasonably large size, which would increase investment costs, pre-magnets 76 can be used according to FIG. 5, placed in the travel direction of veneer 10 prior to the measuring head 13 and its magnets 24. The pre-magnet 76 is preferably a magnet separate from the magnets 24 of the measuring head 13, which can be stronger and more inhomogeneous than the magnet of the measuring head still providing sufficient pre-magnetization to ensure that protons are excited over the range of the magnets 24 of the measuring head 13 in the travel direction of the veneer 10. The travel direction of the veneer 10 is illustrated in FIG. 5 with a black arrow on the left of the veneer 10. A pre-magnet 76 is more affordable with respect to its investment costs than the magnets of the measuring head 13, which have been optimised from the perspective of NMR spectroscopy to achieve the best accuracy. The length of pre-magnets can be 2 to 4 times the length of magnets in the travel direction of the veneer.

Figure 6:
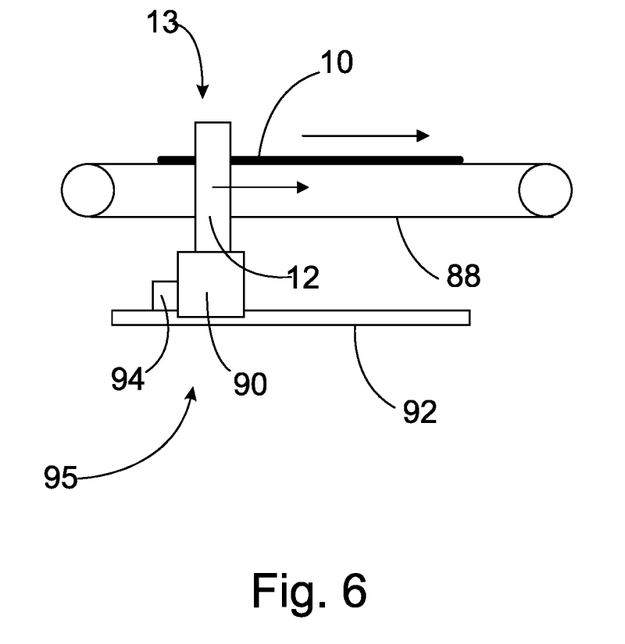
FIG. 6 is an implementation of a system according to the invention according to a second embodiment placed laterally relative to the veneer plane.

As an alternative to the embodiment of FIG. 5, the measuring head 13 can be made to be movable with the veneer 10 according to FIG. 6. In this way, it is possible to increase the dwell time of protons in the veneer 10 in the magnetic field created by the magnets of the measuring head 13 by reducing the transfer speed of the veneer 10 in the process or by increasing the size of the magnets of the measuring head. When using a mobile measuring head 13, pre-magnets are not needed. FIG. 6 shows one exemplary method of implementing a mobile magnetic field with transfer means 95. Transfer means 95 preferably include guides 92 arranged in connection with the veneer 10, a carriage 90 arranged to be movable on the guides 92, a measuring frame 12 fastened to the carriage 90 and a motor and transmission equipment 94 for moving the carriage 90 on the guides 92 in the travel direction of the veneer during the measurement and in the opposite direction between the measurements. By arranging the carriage transfer speed and the guide length suitable in the travel direction of the veneer, a sufficient dwell time and excitation of protons in the magnetic field can be ensured.

Regardless of whether pre-magnetization or magnet transfer with the veneer is used in the range of the magnetic field, it is advantageous that there are at least two, preferably from 4 to 8, measuring heads 13 in parallel, according to FIG. 5. In this way, it is possible to obtain information on moisture distribution also in the transverse direction of the veneer. Each measuring head 13 comprises one coil 22 and two magnets 24. When using parallel measuring heads 13, the transfer of the backward signal to the computer 25 must be scheduled preferably with a multiplexer 36, which schedules the backward signals arriving from the coil 22 of each measuring head 13 alternately to the computer.

The coil used in the system is electrically dimensioned in such a way that, with a selected power source, it can produce the desired frequency pulse or excitation pulse, to a selected magnetic field. For example, when the strength of the magnetic field E is 0.5 T, the frequency pulse applied is in the frequency range of 25 MHZ-26 MHz for generating sufficiently large magnetic flux. Generally, the frequency pulse used is in the range of 50 kHz-150 MHz.

Energy released by the proton p excited according to FIG. 4a provides a backward frequency in the coil 22, which can be measured as a backward signal. The backward signal to be measured can be measured, as shown in FIG. 2, with extremely sensitive measuring equipment 28, such as a receiver, whose measuring accuracy can be in the class of 1 uV. The backward signal to be measured is only an average signal: that is, momentary values are measured for the backward signal in a certain period and an average is calculated for this period based on these values. In other words, the entire spectrum is not measured, as is usually the case in spectroscopy. For example, the duration of the period may be between 0.5 s and 2.0 s. Based on the strength of the backward signal, the relaxation times T1 and T2 of the proton can be calculated. The relaxation time can be calculated with the following formula:

$$T2 = -t / \{\ln[a(t)/a_o]\}$$

Software means 30 have preferably been implemented in a computer 25, which can be used for presenting results as well as for controlling the system. The computer can be a normal PC or equivalent. In turn, the power source is preferably an AC power source, in relation to which a frequency converter can be used to achieve the correct frequency. The power source is used to generate the correct frequency pulse in the coil for increasing the energy level of protons.

The functions of the system can be controlled with the same computer, which has software means for determining veneer moisture distribution based on the relaxation times measured. The system can be controlled with separate control software, which gives electronic controls via a bus field, for example, to the power source for operating the coils.

Figure 7:
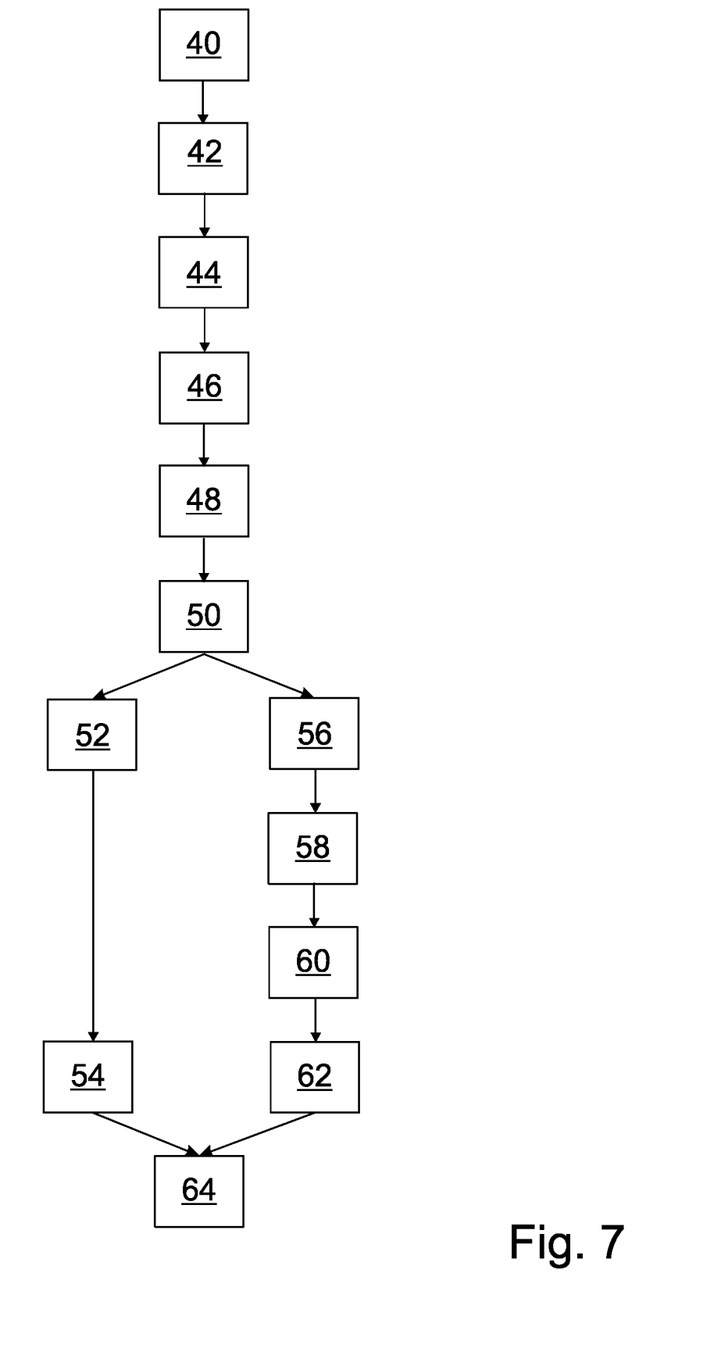
FIG. 7 is a block diagram illustrating the steps of the method according to the invention.

FIG. 7 shows steps 40-62 of an embodiment of the method according to the invention in a block diagram. The method according to the invention starts from guiding a veneer through the measuring head and the measuring frame of the system according to step 40. At the same time, the magnetic field E of FIGS. 4a and 4b has been created in the system 11, preferably with permanent magnets used as magnets 24 according to step 42 of FIG. 7. The purpose of the magnetic field is to enable excitation of protons with frequency pulses generated by the coil. When created by a permanent magnet, the magnetic field is permanent and does not require any specific control. The computer can also be associated with an electronic control unit controlled by control means, while the control unit, in turn, controls the power source of the system to generate frequency pulses for the coil, according to step 44 of FIG. 7. Frequency pulses are preferably generated at the frequency indicated above while the sample is in the magnetic field. Advantageously, the frequency pulse used is a CPMG frequency pulse. Individual pulses of the CPMG frequency pulse are delivered one after the other and they excite veneer protons in the magnetic field, according to step 46 of the figure. The excitation is very rapidly discharged and the energy delivered by the proton arrives at the coil providing a low voltage in the coil, which is measured with the measuring equipment according to step 48. From the measuring equipment, the voltage data can be transferred in the analogue form to an A/D converter or as a digital signal directly to the computer 25 of FIG. 2, where it will be stored in a memory 35 with the software means 30 for further processing.

The amplitude of voltage is advantageously measured continuously and momentary measuring results of voltage are stored in the memory. An average of the amplitudes measured can be calculated with the software means. In addition, an average can be calculated over successive samples, since variations between individual samples are notably greater than variations between successive signals of the same sample.

Advantageously, based on the backward signal measured in step 50, a correlation model is created by means of mathematical fitting, wherein a backward signal having a form of an exponential signal has been divided into a correlation model comprising exponential components. The general form of the correlation model is as follows:

$$\mathrm{Exp} = \left(\sum_{1}^{2-4} \left(A_x \exp\left(-\frac{t}{T}\right) + C\right)\right)$$

where A is the amplitude of the backward signal, t is the measurement time of the backward signal, T is the relaxation time and C is a measuring-technical constant. In the model, T=1/R, where R is the relaxation speed. The measuring-technical constant is the proportion of the backward signal consisting of the base line disturbance of the system.

The number of summable exponential factors used in the model can be between one and four, preferably two, or most preferably three. Three exponential components correspond best to the physical model of water location in veneer, where one component corresponds to the proportion of water bound internally in the veneer fibre cell and the two others correspond to the free and bound proportion of cell-external water. The value of the exponential signal is directly derived during the NMR measurement with measuring equipment, measured from the coil. The correlation model of three exponential components can be mathematically fitted to the form of the measured exponential signal using, for example, the method of least squares; based on this, it is possible to calculate the relaxation time and amplitude for each exponential component. In the most advantageous model of three exponential factors, the exponential signal model is as follows:

$$\mathrm{Exp} = A_1 * \exp(-t/T_{21}) + A_2 * \exp(-t/T_{22}) + A_3 * \exp(-t/T_{23}) + D.$$

The proton relaxation time T1 or T2 measured based on the measured amplitude of the backward signal is used together with the mathematically formed correlation model to determine veneer moisture distribution with the software means 30 in step 52 of FIG. 7.

Below is an example showing percent values of relative amplitude and values of the relaxation time T2 (ms) for birch, teak and mahogany veneers:

|          | Birch | Teak | Mahogany |
|----------|-------|------|----------|
| $A_1$    | 42.1  | 55.9 | 43.6     |
| $A_2$    | 39.4  | 23.9 | 19.7     |
| $A_3$    | 18.5  | 20.2 | 36.8     |
| $T_{21}$ | 3.2   | 3.5  | 2.1      |
| $T_{22}$ | 9.5   | 30.2 | 12.1     |
| $T_{23}$ | 44.2  | 91.9 | 42.3     |

The percent value of bound water $p_b$ in micropores for birch is 33.9% and 7.1% in lumens, whereas teak has 11.3% in micropores and 3.5% in lumens and further, mahogany has 17.0% in micropores and 4.7% in lumens. These exemplary values shown above have been achieved using a CPMG pulse series and a surface coil, a 90° pulse with a duration of 35 ms, a 180° pulse with a duration of 70 ms in the measurement with an echo time (TE) of 2 ms.

The percent value of bound water from the total amount of water in the cell walls is 42.1% for birch, 14.3% in micropores and 2.8% in lumens. For teak, 55.9% is in cell walls, 6.3% in micropores and 0.8% in lumens, and for mahogany, 43.6% in the cell wall, 7.4% in micropores and 0.9% in lumens.

Figure 8:
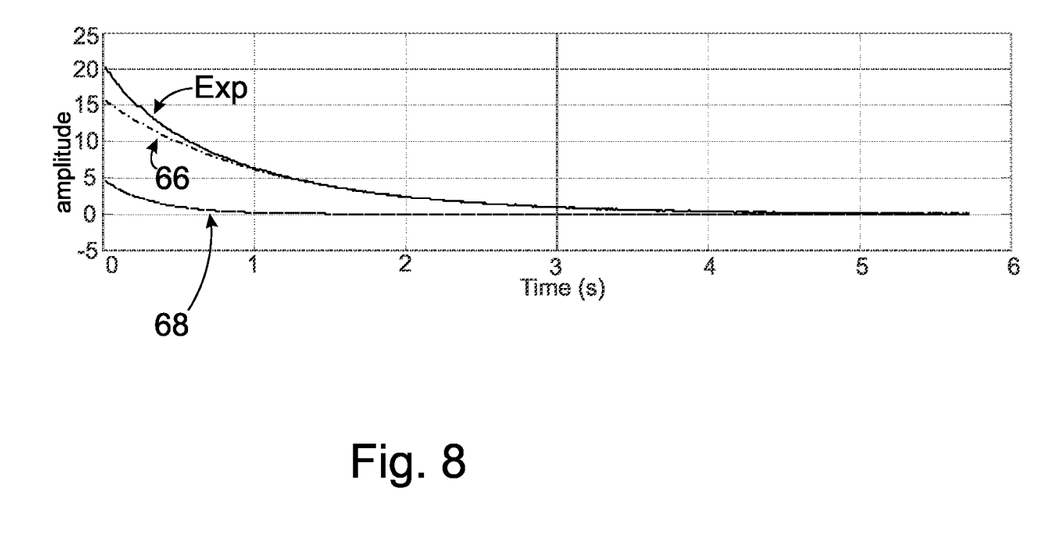
FIG. 8 is a graphic representation of the double exponential model.

The form of the exponential signal in the case of the double exponential model is shown in FIG. 8, but it should be understood that a correlation model of three and four exponential components also follows quite well the shape of the exp curve of FIG. 8. In the double exponential model, the backward signal Exp is formed of two exponent parts according to FIG. 8, of which part 66 originates from fibre-internal water and part 68 from fibre-external water. The relaxation time enables calculation of veneer moisture distribution in step 54 of FIG. 7. In the calculation, in addition to the relaxation time, the NMR measurement provides the backward signal amplitude A, which is utilised in the calculation.

Below is a calculation example when using the model of two exponential factors for the exponential signal:

$$Exp = A_1 * \exp(-t/T_{21}) + A_2 * \exp(-t/T_{22}) + D.$$

It is known that $R_{21}=1/T_{21}=p_{bc}*R_{2b}+p_{fc}*R_{2f}$ and $R_{22}=1/T_{22}=p_{bt}*R_{2b}+p_{f2}*R_{2f}$, therefore, relaxation speeds $R_{21}$ and $R_{22}$ calculated from the strength of the exponential signal in step 56 of FIG. 7 tell the average movement state of water molecules inside and outside veneer. In addition, it is known that for the first exponential component $1/T_{21}=p_b*1/T_{2b}+p_{fc}*1/T_{2f}$ and for the second component $1/T_{22}=p_{bL}*1/T_{2b}+p_{fL}*1/T_{2f}$.

Since the molecular structure of wood is similar, relaxation speeds $R_{2b}$ and $R_{2f}$ are the same in all parts of wood: thus, this can be written as $R_{2b}=R_b$ and $R_{2f}=R_f$. Binding with water thus means binding with a hydrogen bond to chemical groups of wood or an exchange of hydroxyl group —OH so that $p_b$ is proportional to the material surface area.

Hence, equations $$R_2 = p_b * R_b + p_f * R_f \text{ and } p_b + p_f = 1$$

give the proportion of water bound in step 58

$$p_b = (R_2 - R_f)/(R_b - R_f)$$

In other words, by defining $R_f$ and $R_b$, the proportion of bound water in different parts of fibre can be calculated. Correspondingly, in step 60, the proportion of free water $p_f=1-p_b$ can be calculate.

In veneer, water molecules are bound to hydroxyl groups, mainly those of cellulose and hemicelluloses, and to some extent, to OH groups of lignin as well. Water absorbed to the cell wall breaks cellulose-cellulose-hydrogen bonds and increases the chain mobility. New empty spaces are created between the chains, and water in these empty spaces is called "free bound water". Cell walls also contain micropores with a maximum size of approximately 2-4 nm. Bound water can be present in lumens.

According to an advantageous embodiment, veneer moisture distribution calculated in step 54 of FIG. 7 using the model of two exponential signals and veneer moisture distribution calculated in step 62 using the model of three or four exponential signals are compared to each other 64 for assessing the reliability of calculation. A reliability metric can be, for example, the percent deviation of these two veneer moisture distributions relative to each other or relative to a previously calculated value. The final veneer moisture distribution can be the average of these moisture distributions or a filtered average.

The method and system according to the invention can also be used to determine the absolute moisture content of veneer provided that calibration steps have been performed before using the method to determine the moisture content of veneer samples with furnace drying, for example, and relaxation times and amplitudes of identical second samples with NMR spectroscopy. Based on these, we can derive the measurement constant values of the correlation model composed of exponential components, based on which we can finally also determine the absolute moisture content values.

A system according to the invention can be implemented using components manufactured by Resonance Systems as the NMR spectrometer and duplexer, circuits manufactured by Intelligent-Appliance as the multiplexer circuit, magnets manufactured by Xiamen Dexing MAgnet Tech. Co, Ltd. as magnets. Common components suitable for the application can be used as coils and sample units, of which the sample unit is such that veneer can move through it, which can be implemented by the use of a measuring frame to which magnets and coils can be fastened. The coil must be tuned to the correct frequency, which depends on magnets according to equation f=gB, where g is a constant 42.58 Mhz/T and B is the magnetic field strength in Tesla.

The invention claimed is:

1. A method for measuring a moisture distribution of veneer with NMR spectroscopy in a serial production of veneer as online measurement steps, wherein a whole veneer is moved at a movement speed along a travel direction in a travel plane, the veneer having a width between 10 cm and 200 cm in a transverse direction perpendicular to the travel direction in the travel plane, and two sides, the method including steps of:

creating a magnetic field in a selected point in the transverse direction of the veneer for exciting hydrogen protons in water contained in the veneer, by using two magnets located on opposite sides of the veneer, one side above and another side below the travel plane, and opposite to each other;

leading the veneer to the magnetic field;

exposing the hydrogen protons of the veneer to the magnetic field for a time required to obtain a predetermined pre-magnetization and excitation of the hydrogen protons either by dimensioning the magnetic field in the travel direction of the veneer to a predetermined range relative to movement speed of the veneer by including a pre-magnet for each magnet placed prior to the magnet in the travel direction of the veneer or by moving the magnet and the magnetic field created by the magnet in the travel direction of the veneer during the measurement;

exciting the hydrogen protons in veneer with frequency pulses provided by a surface coil;

measuring a backward signal of frequency pulses returning from the protons to the surface coil, wherein the measurement is taken from the veneer currently in the veneer production process without deviating the veneer from its normal travel path in the veneer production process and without stopping or slowing down the veneer in the veneer production process, wherein the magnets and the surface coil are supported using a measuring frame;

fitting, based on a physical model of water location in fibres of the veneer, where a first component of water corresponds to water in cell walls of each fibre, a second component of water corresponds to water contained in small pores, a third component of water corresponds to water contained in structures respectively, the backward signal mathematically as a correlation model which is a model consisting of three exponential signals $Exp=A_1*exp(-t/T_{21})+A_2*exp(-t/T_{22})+A_3*exp(-t/T_{23})+D$, where D is a measuring-technical constant, Exp is the backward signal, $A_1, A_2, A_3$ are amplitudes of the three exponential signals of the backward signal, each amplitude relating to one of the three water components, $T_{21}, T_{22}, T_{23}$ are corresponding relaxation times of the three water components and t is the signal measurement time, thereby obtaining the amplitudes $A_1, A_2, A_3$ and relaxation times $T_{21}, T_{22}, T_{23}$; and determining the moisture distribution within the cell walls, small pores and larger structures of veneer based on the amplitudes $A_1, A_2, A_3$ and the relaxation times $T_{21}, T_{22}, T_{23}$.

2. The method according to claim 1, wherein in the online measurement step, the measurement is made simultaneously with at least two measuring heads located parallel in direction perpendicular to the travel direction of the veneer, each measuring head comprising the surface coil and the two magnets for forming a transverse moisture distribution of veneer.

3. The method according to claim 1, wherein the online measurement step, a gradient coil is additionally used for creating a gradient field for determining a moisture distribution of veneer in direction perpendicular to the travel plane.

4. The method according to claim 2, wherein in the online measurement step, a multiplexer is used for controlling the surface coils and magnets identically in parallel.

5. A system for determining a moisture distribution of veneer in a serial production of veneer, comprising:

transfer equipment configured to move the whole veneer in a serial production of veneer at a movement speed along a travel direction in a travel plane, wherein the veneer has a width between 10 cm and 200 cm in a transverse direction perpendicular to the travel direction in the travel plane and two sides;

a time domain NMR spectrometer for determining the moisture distribution of the veneer, the NMR spectrometer including:

at least one surface coil arranged in connection with the veneer to excite hydrogen protons in water contained in the veneer using frequency pulses;

two magnets located on opposite sides of the veneer, one side above and another side below the travel plane, and opposite to each other for creating a magnetic field in the veneer in a selected point in the transverse direction of the veneer;

either i) a pre-magnet for each magnet located prior to the magnet in the travel direction of veneer, length of the pre-magnets being dimensioned in the travel direction of the veneer to a predetermined range relative to the movement speed of the veneer, or ii) second transfer equipment for transferring the magnets in the travel direction of veneer during measurement such that the hydrogen protons of the veneer are exposed to the magnetic field for a time required for a predetermined pre-magnetization with respect to excitation of the hydrogen protons;

a power source with controllers connected to the surface coil for generating frequency pulses;

measuring equipment for measuring intensity of current generated by the frequency pulse returning to the surface coil from the hydrogen protons for generating a backward signal;

a computer with a memory and a software for determining the moisture of the veneer based on the backward signal, wherein a correlation model is stored in the memory, which is a model consisting of three exponential signals $Exp=A_1*exp(-t/T_{21})+A_2*exp(-t/T_{22})+A_3*exp(-t/T_{23})+D$, where D is a measuring-technical constant, Exp is the backward signal, $A_1, A_2, A_3$ are amplitudes of the three exponential signals of the backward signal, wherein each of the amplitudes relates to one of three water components of a physical model of water location in fibres of the veneer, namely first component, second component and third component, wherein the first component of water corresponds to water in the cell walls, the second component corresponds to water contained in small pores and the third component corresponds to water contained in structures, respectively, $T_{21}, T_{22}, T_{23}$ are corresponding relaxation times of the three water components and t is the signal measurement time, thereby obtaining the amplitudes $A_1, A_2, A_3$ and relaxation times, wherein the software is arranged to:

fit the backward signal mathematically to the correlation model to determine the amplitudes $A_1, A_2, A_3$ and the $T_2$ relaxation times $T_{21}, T_{22}, T_{23}$ of the three different water compartments of the veneer fibres; and determine the moisture distribution within the veneer based on the amplitudes $A_1, A_2, A_3$ and the relaxation times $T_{21}, T_{22}, T_{23}$.

6. The system according to claim 5, further comprising at least two measuring heads each comprising the surface coil and the two magnets for taking a measurement from several parallel measuring heads simultaneously for forming a transverse moisture distribution of veneer.

7. The system according to claim 5, further comprising from 4 to 8 parallel measuring heads each comprising the surface coil and the two magnets for taking a measurement from the 4 to 8 parallel measuring heads simultaneously for forming a transverse moisture distribution of veneer.

8. The system according to claim 5, further comprising a multiplexer for controlling backward signals arriving from the surface coils of parallel measuring heads alternately to the computer for calculation.

* * * * *